US012770777B2

(12) United States Patent
Alkhardawi

(10) Patent No.: US 12,770,777 B2
(45) Date of Patent: Oct. 20, 2026

(54) USE OF MULTI TYPES HIGH VOLTAGE BUSHINGS FOR EMERGENCY POWER TRANSFORMERS

(71) Applicant: SAUDI ARABIAN OIL COMPANY, Dhahran (SA)

(72) Inventor: Wasseem Ali Alkhardawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 878 days.

(21) Appl. No.: 18/058,186

(22) Filed: Nov. 22, 2022

(65) Prior Publication Data

US 2024/0170198 A1 May 23, 2024

(51) Int. Cl.

| | |
|---|---|
| *H02H 7/04* | (2006.01) |
| *H01F 27/04* | (2006.01) |
| *H01F 27/28* | (2006.01) |
| *H01F 27/32* | (2006.01) |

(52) U.S. Cl.

CPC ......... *H01F 27/2885* (2013.01); *H01F 27/04* (2013.01); *H01F 27/323* (2013.01)

(58) Field of Classification Search

CPC ........ H01B 17/26; H01B 17/28; H01B 17/36; H02H 7/04

See application file for complete search history.

(56) References Cited

U.S. PATENT DOCUMENTS

| | | | | | |
|---|---|---|---|---|---|
| 4,360,849 | A * | 11/1982 | Harris | H02B 5/00 361/603 |
| 4,431,859 | A * | 2/1984 | Kishida | H01B 17/36 174/209 |
| 5,816,835 | A | 10/1998 | Meszaros | |
| 8,258,911 | B2 | 9/2012 | Fouquet | |
| 8,455,763 | B2 | 6/2013 | Dais et al. | |
| 11,283,363 | B2 | 3/2022 | Raju | |
| 2015/0069572 | A1 | 3/2015 | Khanolkar et al. | |
| 2021/0108971 | A1* | 4/2021 | Blair | H02J 13/00002 |
| 2024/0347234 | A1* | 10/2024 | Ladani | H01B 17/28 |

OTHER PUBLICATIONS

Office Action issued by Saudi Arabian patent office for corresponding Saudi Arabian patent application No. 123450861, mailed Jan. 12, 2025 (7 pages).

* cited by examiner

*Primary Examiner* — Chau N Nguyen

(74) *Attorney, Agent, or Firm* — Osha Bergman Watanabe & Burton LLP

(57) ABSTRACT

A system for a high voltage power system (HV system) for changing a voltage of an electric current from a first voltage to a second voltage by having the electric current conducted through at least one of multiple connections and across the transformer casing of a high voltage power transformer. The electric current is substantially electrically insulated from the transformer casing and is conducted to the high-voltage side of the HV transformer. The HV transformer is equipped with multiple respective receptacles for the multiple connections. The receptacles include a high-voltage cable box receptacle, a high-voltage top receptacle, and a high-voltage side receptacle.

16 Claims, 4 Drawing Sheets

USE OF MULTI TYPES HIGH VOLTAGE BUSHINGS FOR EMERGENCY POWER TRANSFORMERS

BACKGROUND

A high voltage power system (HV system) uses high voltage power transformers equipped with high voltage bushings (HV bushings or bushings) assembled together as a transformer-bushing assembly. The bushings provide a connection between the transformer and a connection point, such as a substation, on an electrical power transmission and distribution system (TD system). The transformers used in the HV system may be relatively common within a given TD system in terms of transformer specification, i.e., there may be many of the same transformers throughout the TD system. In contrast, the HV bushings may differ in their type when compared with other bushings throughout the TD system. HV bushings may be site-specific to the location of the substation whereas the transformer may be common throughout the TD system.

To replace a failed transformer, the common practice is to replace it with a transformer with the same specification as the failed transformer. Bushings are commonly integral to the transformer thus forming a transformer-bushing assembly. Bushing replacement may be performed in the field near the failed transformer, but replacement is best done in a controlled environment. Therefore, a common practice is to prepare transformer-bushing assemblies ahead of time using common transformers with site-specific bushings. To stock spare transformers thus requires stocking spare transformer-bushing assemblies each with a different site-specific bushing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure describes a sparing philosophy and a return-to-service strategy that, through the use of an HV system according to embodiments disclosed herein, may reduce out-of-service duration for electrical power transmission and distribution substations. Embodiments disclosed herein install three different types of high voltage bushing on a single power transformer.

This disclosure presents, in accordance with one or more embodiments, systems for a high voltage power system (HV system) for changing a voltage of an electric current from a first voltage to a second voltage by having the electric current conducted through at least one of multiple connections, across the transformer casing of a high voltage power transformer. The electric current is substantially electrically insulated from the transformer casing and is conducted to the high-voltage side of the HV transformer. The HV transformer is equipped with multiple respective receptacles for the multiple connections. The receptacles include a high-voltage cable box receptacle, a high-voltage top receptacle, and a high-voltage side receptacle.

This disclosure also presents, in accordance with one or more embodiments, methods for changing a voltage of an electric current from a first voltage to a second voltage using the HV system including a high voltage power transformer (HV transformer) with a transformer casing. The electric current is conducted through at least one of multiple connections, across the transformer casing and substantially electrically insulated from the transformer casing, and to the HV transformer. The method includes providing the HV transformer. The HV transformer includes multiple respective receptacles for the multiple connections. The method continues by installing one or more connections within at least one of the multiple respective receptacles, electrically connecting the one or more connections to the HV transformer and electrically connecting the one or more connections to a substation, conducting the electric current through the one or more connections and across the transformer casing and substantially electrically insulated from the transformer casing; and changing the voltage of the electric current from the first voltage to the second voltage.

Other aspects and advantages of the claimed subject matter will be apparent from the following description and the appended claims.

DETAILED DESCRIPTION

Figure 1:
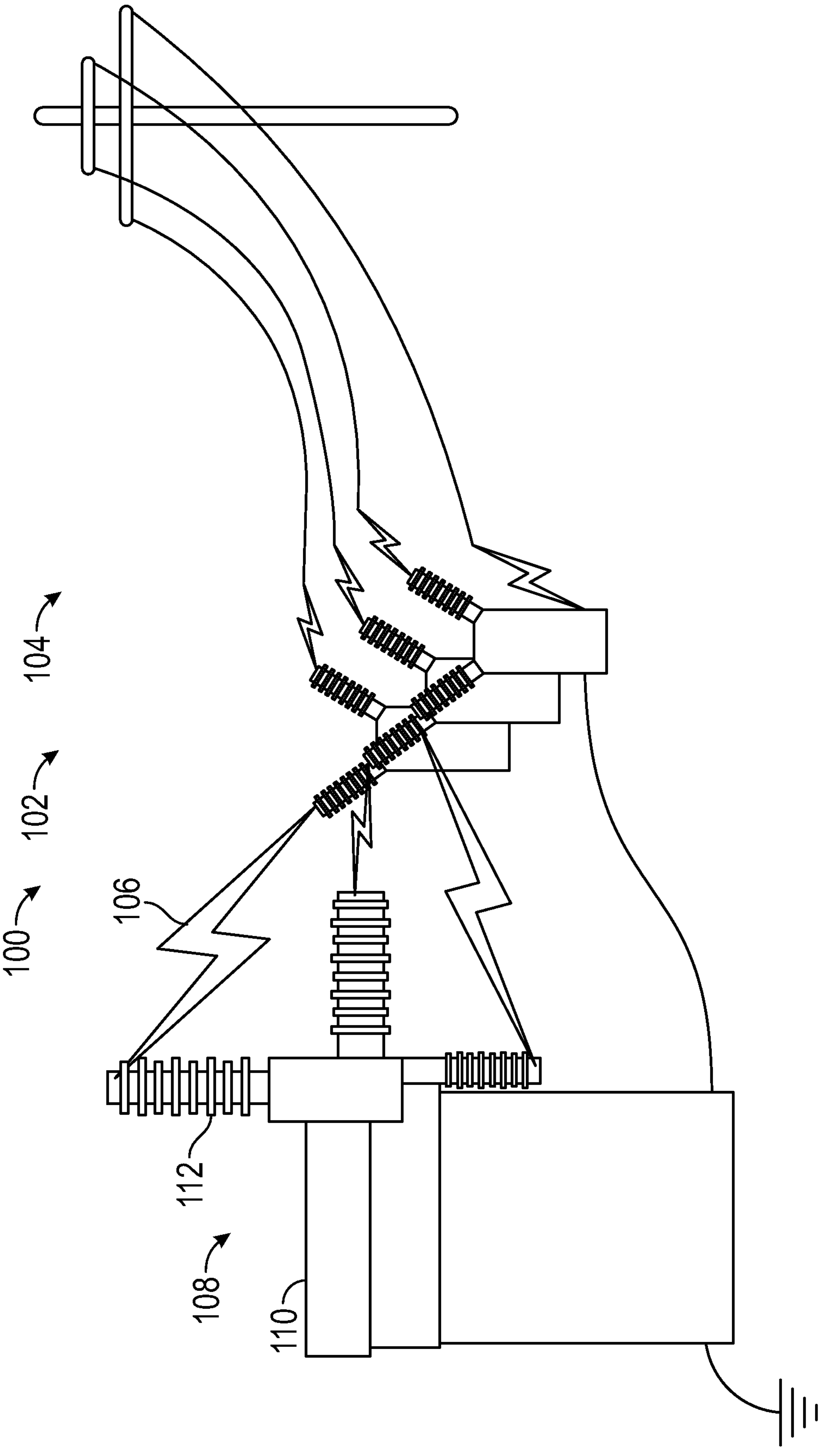
FIG. 1 shows an environment in accordance with one or more embodiments.

HV transformer bushings (HV bushing or bushing) are accessories for use with HV transformers. Bushings allow electrical conductors to pass from inside the transformer to the outside without coming into electrical continuity contact with the transformer casing. Bushings are used to attach HV transformers to substations in which the HV transformers are installed. Although installation of a bushing accessory within an HV transformer is simple in concept, in practice it is a labor-intensive precision process. The duration of time to install a replacement bushing within a replacement transformer may appreciably impact the return-to-service (RTS) duration of a substation that is out-of-service (OOS) due to a failed transformer-bushing assembly. Operators of transmission and distribution systems (TD systems) may store and maintain spare transformers for all facilities under the management of the operator. Transformers may all be uniform in terms of their specification and thus one specification of transformer could be procured, stored, and maintained. Bushings, on the other hand, may differ throughout the TD system according to the site-specific conditions of the different types of bushing used for connection to the transformer. A bushing assortment of bushings of more than one type, such as at least two bushing types or at least three bushing types where each type meets site-specific conditions, could also be procured, stored, and maintained. For example, ordering one transformer with three different types of bushing will avoid the costs of ordering one spare transformer for every substation that has different HV side connections to the transformer. In this manner one transformer with three different bushing types can be kept as a spare for many substations with different HV connections based on the assumption that only one failed transformer incident may occur at a time.

To reduce the OOS time duration, and to meet the site-specific conditions to return a substation to service, a site-specific transformer-bushing assembly (an HV system) could be ordered. Each site-specific HV system would include the one type of transformer and the one type of site-specific bushing. These site-specific HV systems could be procured, stored, and maintained for deployment to an OOS substation. Storing pre-assembled site-specific HV systems may eliminate a delay to RTS (may reduce the OOS duration) of the substation. This sparing philosophy and RTS strategy to meet the site-specific conditions requires that a spare transformer assortment of HV systems needs to be ordered where each of the one type of transformer is preinstalled with one of the site-specific bushings.

This disclosure describes a sparing philosophy and a return-to-service strategy that, through the use of an HV system according to embodiments disclosed herein, may reduce out-of-service duration for electrical power transmission and distribution substations. The common practice in the industry is to have only one transformer with one type of bushing to replace each similar failed HV system. Embodiments disclosed herein propose installing three different types of high voltage bushing on a single power transformer to create a universal transformer-bushing assembly (an HV system) spare. The proposed HV system with three types of bushings on one transformer will allow the utilization of a single power transformer in multiple substations where the existing high voltage (HV) bushing used for connection to the transformer is one of three different bushing types. This method may avoid any modification at the substation of the HV system to connect the transformer to the substation. This invention can provide major cost saving and optimization of the number of spare transformers that may be ordered for many substations that use different types of bushings for connection. The HV system will have three types of HV bushings, e.g., oil-to-oil HV bushing, oil-to-air HV bushing, and oil-to-$SF_6$ HV bushing ($SF_6$ is sulfur hexafluoride, a colorless, odorless, non-toxic, non-flammable, chemically inert gas with high dielectric properties, almost three times greater than air or nitrogen.) The term oil refers to dielectric oil.

In accordance with one or more embodiments the HV system may meet the requirements of a response to one or more recommendations for improving robustness throughout a given TD system. For example, a recommendation may be to procure, store, and maintain quantity ten high voltage power transformers for utilization during emergencies. The ten may consist of an assortment of HV systems using one specification of transformer but differentiated by the type of HV bushing pre-installed on the transformer. For example, of the ten HV systems, the assortment may be divided up so that three HV systems have one oil-to-oil HV bushing, three HV systems have one oil-to-air HV bushing, and four HV systems have one oil-to-$SF_6$ HV bushing.

This sparing philosophy reduces the number of spare HV systems to be procured, stored, and maintained because each one of the assemblies can fit in multiple locations where the locations require site-specific types of HV bushings. This sparing philosophy will contribute to an RTS strategy that may reduce OOS duration.

Embodiments disclosed herein relate to a high voltage power transformer pre-installed with the necessary quantity of each of three types of bushing: oil-to-oil HV bushing, oil-to-air HV bushing, and oil-to-$SF_6$ HV bushing. Electrical bushings in the present disclosure may be insulating structures that include a through-conductor or provide a central passage for such a conductor, with provision for mounting a barrier, conducting or otherwise, for the purpose of insulating the conductor from the barrier and conducting current from one side of the barrier to the other. Bushings may be capacitance-graded or gas-insulated types.

FIG. 1 shows an environment 100 in accordance with one or more embodiments. A high voltage power system (herein an HV system 108) has a high voltage transformer (an HV transformer 110) with an HV transformer high-voltage side (an HV side 126) and is located at a substation site 102 of an electrical power transmission and distribution system (herein a TD system 104). HV transformer 110 of HV system 108 may be electrically connected to the TD system 104 through power lines 106. HV transformer 110 may use a bushing 112 at each connection point on the HV side 126 of the HV transformer 110 to connect between power lines 106 and HV transformer 110. An HV transformer may be a voltage converter defined as 1000 Vac (volts, alternating current) at 50 or 60 Hz (hertz) frequency. Although embodiments disclosed herein relate to HV transformers, this is not intended to be limiting. Any type of transformer, AC or DC, electrical apparatus, machinery, switchgear, installation, or reactor may also be implemented without departing from the scope of the present disclosure. For example, the transformer may be a medium voltage AC transformer, a DC transformer, a reactor, or an oil circuit breaker, etc. Although embodiments disclosed herein relate to HV transformer bushings mounted in receptacles on the HV side, this is not intended to be limiting. Bushings for other applications and on other locations on the HV transformer may also be implemented without departing from the scope of the present disclosure. For example, the bushing(s) may be bushings for use in other than three-phase systems, bushings for high-voltage direct current systems, bushings for testing transformers, bushings for capacitors, or reactor bushings.

Figure 2A:
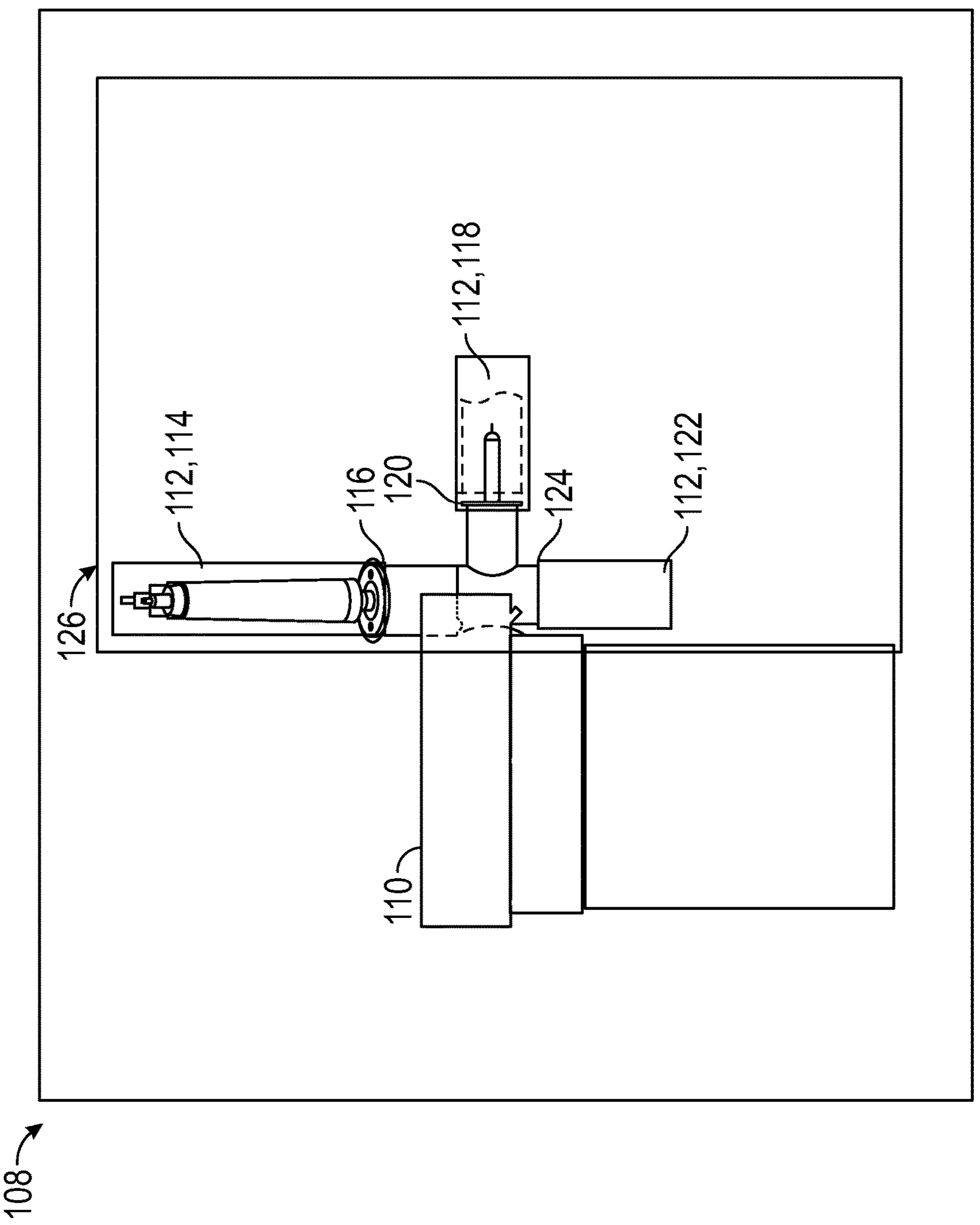
FIG. 2A shows an HV transformer in accordance with one or more embodiments.
Figure 2B:
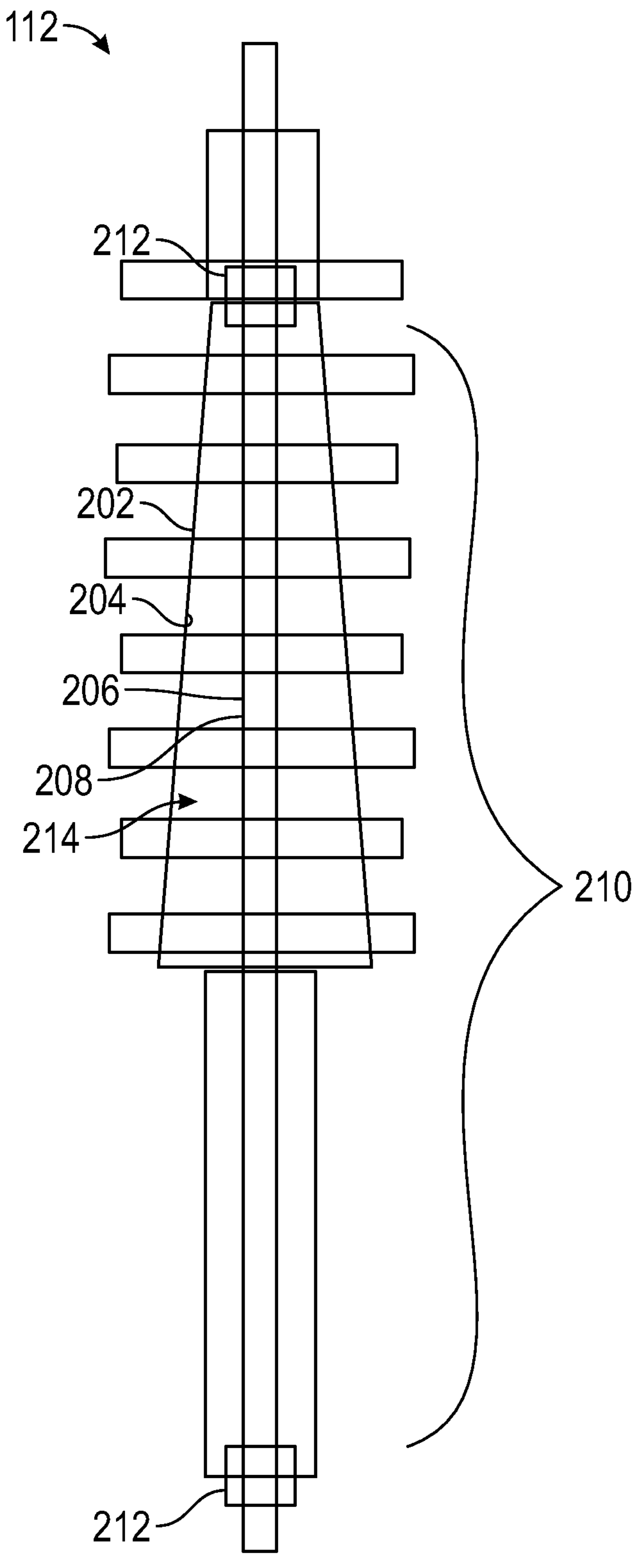
FIG. 2B shows a connector in accordance with one or more embodiments.

FIG. 2A and FIG. 2B show the HV system 108 in accordance with one or more embodiments. An HV transformer 110 may be of a common standard within the HV system 108 installations at the substation sites 102 within the TD system 104. In contrast, bushing 112 may be designed to different specifications to meet conditions specific to each installation. Substation site conditions vary throughout TD system 104. As such each substation site 102 may require specific designs for each bushing 112 installed on each HV transformer 110 at each substation site 102. The same specification of HV transformer 110 may be used uniformly in a variety of substation sites 102, whereas the specification for each bushing 112 may differ for the same variety of substation sites 102. As such, replacing an HV transformer 110 may require installation of bushing 112 selected specific to each substation site 102. The specification of bushing 112 may therefore be the only factor preventing universal use of the HV system 108 throughout the TD system 104.

FIG. 2A illustrates an embodiment wherein a specific type of bushing 112 is installed in a specific receptacle on the HV side 126 of the transformer. More specifically, an oil-to-air HV bushing 114 is shown in a high-voltage top receptacle 116. An oil-to-$SF_6$ HV bushing 118 is shown installed in a high-voltage side receptacle 120. An oil-to-oil HV bushing 122 is shown installed in a cable termination box, herein a high-voltage cable box receptacle 124. Although the three types of bushings disclosed herein relate to oil-to-oil HV bushing, oil-to-air HV bushing, and oil-to-$SF_6$ HV bushing, this is not intended to be limiting. It is also possible to have two different types of bushing instead of three depending on the bushing, transformer, and/or HV system types needed for the substations.

Any type of bushing may be implemented without departing from the scope of the present disclosure. For example, the bushing types may include solid type, bulk type, capacitance-graded, condenser type, air-insulated, oil-insulated, oil-filled, air-to-$SF_6$, $SF_6$-to-oil, oil-impregnated paper, resin-impregnated synthetic (RIS), cast-insulation, etc. Likewise, although the three types of receptacles (top, side, and cable box) are described as being associated with a specific type of bushing, this is not intended to be limiting. Any type of bushing may be located within any type of receptacle, i.e., every bushing type may be in a different location of the transformer depending on the design of the transformer. For example, although the high-voltage top receptacle is shown in FIG. 1 and in FIG. 2A with a bushing open to the air, the high-voltage top receptacle may comprise an $SF_6$ gas-insulated busduct or a cable termination box and the cable termination box may be vacant or may be filled with oil. Likewise, although the high-voltage side receptacle is shown in FIG. 1 with a bushing open to the air, the high-voltage side receptacle may comprise an $SF_6$ gas-insulated busduct or may comprise a vacant enclosure or an oil-filled enclosure. And finally, although the high-voltage cable box receptacle is shown in FIG. 1 with a bushing open to the air, the high-voltage cable box receptacle may comprise an enclosure or an oil-filled enclosure such as a cable box, or the cable box receptacle may comprise an $SF_6$ gas-insulated busduct.

FIG. 2B illustrates an embodiment of the bushing 112 used for connection. Each of the multiple connections has in common a connection body 202 that has a body inner surface 204. Each bushing 112 also has at least one of a conductor 206. The conductor has a conductor outer surface 208 that extends along a conductor length 210. Each conductor 206 is encapsulated within the connection body 202 and is attached to the connection body 202 at an attachment point 212. The conductor 206 extends through opposite ends of the connection body 202.

Each of the multiple connections also may have a substantially electrically insulating material 214 encapsulated between the conductor outer surface 208 and the body inner surface 204. The substantially electrically insulating material 214 may be located all along the conductor length 210. The substantially electrically insulating material 214 is also placed between the conductor 206 and each one of the attachment points 212. In this manner the substantially electrically insulating material 214 prevents flow of electrical current, and thereby electrically insulates, conductor 206 from connection body 202.

Figure 3:
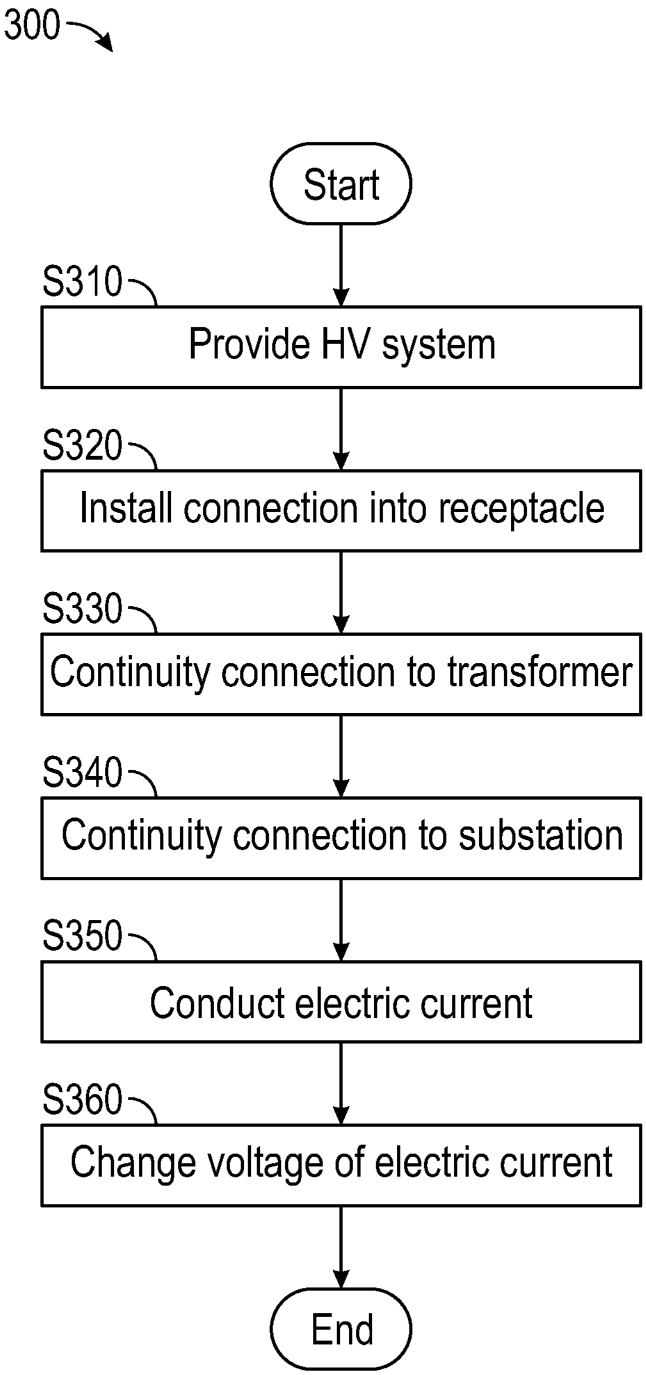
FIG. 3 shows a flowchart in accordance with one or more embodiments.

FIG. 3 shows a flowchart in accordance with one or more embodiments. The flowchart shows a method (300) for changing the voltage of an electric current from a first voltage to a second voltage. Referring to FIG. 1, FIG. 2A, and FIG. 2B together, initially the HV transformer is provided (S310). In accordance with one or more embodiments the HV transformer may comprise multiple respective receptacles for the multiple connections. The connections are disposed next within the multiple respective receptacles (S320). The connections are then connected to allow electrical current continuity to the HV transformer (S330). The connections are also connected to allow electrical current continuity to a substation (S340). Then the electric current is conducted through the connections across and substantially electrically insulated from the transformer casing (S350). In this manner the HV System changes the voltage of the electric current from the first voltage to the second voltage (S360).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A high voltage power system (HV system) for changing a voltage of an electric current from a first voltage to a second voltage, wherein the electric current is conducted through at least one of multiple connections, across a transformer casing of a high voltage power transformer (HV transformer) that is a voltage converter defined as 1000 Vac at 50 or 60 Hz frequency and substantially electrically insulated from the transformer casing, and to the HV transformer, the HV system further comprising:

an HV transformer high-voltage side; and multiple respective receptacles for the multiple connections, comprising:

a high-voltage cable box receptacle, wherein the multiple connections comprise bushings of at least three bushing types, and wherein the at least three bushing types comprise at least one of each of an oil-to-oil HV bushing, an oil-to-air HV bushing, and an oil-to-$SF_6$ HV bushing.

2. The HV system of claim 1, wherein:

the multiple respective receptacles comprise a high-voltage top receptacle.

3. The HV system of claim 1, wherein:

the multiple respective receptacles comprise a high-voltage side receptacle.

4. The HV system of claim 3, wherein the high-voltage side receptacle further comprises an $SF_6$ gas-insulated busduct.

5. The HV system of claim 1, wherein:

each of the at least three bushing types comprises:

a connection body comprising a body inner surface.

6. The HV system of claim 5, wherein each of the at least three bushing types comprises at least one conductor comprising a conductor outer surface extending along a conductor length.

7. The HV system of claim 6, wherein the at least one conductor:

is disposed within the connection body, attached to the connection body at an attachment point, and extends through opposite ends of the connection body.

8. The HV system of claim 7, wherein each of the at least three bushing types comprises a substantially electrically insulating material.

9. The HV system of claim 8, wherein the substantially electrically insulating material is disposed between the conductor outer surface along the conductor length of the at least one conductor, which is encapsulated within the connection body, and the body inner surface.

10. The HV system of claim 8, wherein the substantially electrically insulating material:

is disposed between the at least one conductor and the attachment point.

11. The HV system of claim 1, wherein the multiple respective receptacles are disposed on the HV transformer high-voltage side.

12. A method for changing a voltage of an electric current from a first voltage to a second voltage using a high voltage power system (HV system) comprising a high voltage power transformer (HV transformer) with a transformer casing, wherein the electric current is conducted through at least one of multiple connections, across the transformer casing and substantially electrically insulated from the transformer casing, and to the HV transformer, and wherein the HV transformer is a voltage converter defined as 1000 Vac at 50 or 60 Hz frequency, the method comprising:

providing the HV transformer, which comprises multiple respective receptacles for the multiple connections;

disposing one or more connections within at least one of the multiple respective receptacles;

connecting, so as to allow an electrical current continuity of the electric current, the one or more connections to the HV transformer;

connecting, so as to allow the electrical current continuity of the electric current, the one or more connections to a substation;

conducting the electric current through the one or more connections and across the transformer casing and substantially electrically insulated from the transformer casing; and changing the voltage of the electric current from the first voltage to the second voltage, wherein disposing the multiple connections on the HV transformer high-voltage side further comprises disposing bushings of at least three bushing types, and wherein the at least three bushing types comprise at least one of each of an oil-to-oil HV bushing, an oil-to-air HV bushing, and an oil-to-$SF_6$ HV bushing.

13. The method of claim 12, wherein the HV transformer comprises a high-voltage cable box receptacle.

14. The method of claim 13, wherein the HV transformer further comprises a high-voltage top receptacle.

15. The method of claim 13, wherein the HV transformer further comprises a high-voltage side receptacle.

16. The method of claim 12, wherein providing the multiple respective receptacles further comprises disposing the multiple connections on an HV transformer high-voltage side.

* * * * *